June 15, 1954
S. ADKINS
2,680,966
WHEEL BALANCE TESTING APPARATUS
Filed Nov. 30, 1951
2 Sheets-Sheet 1
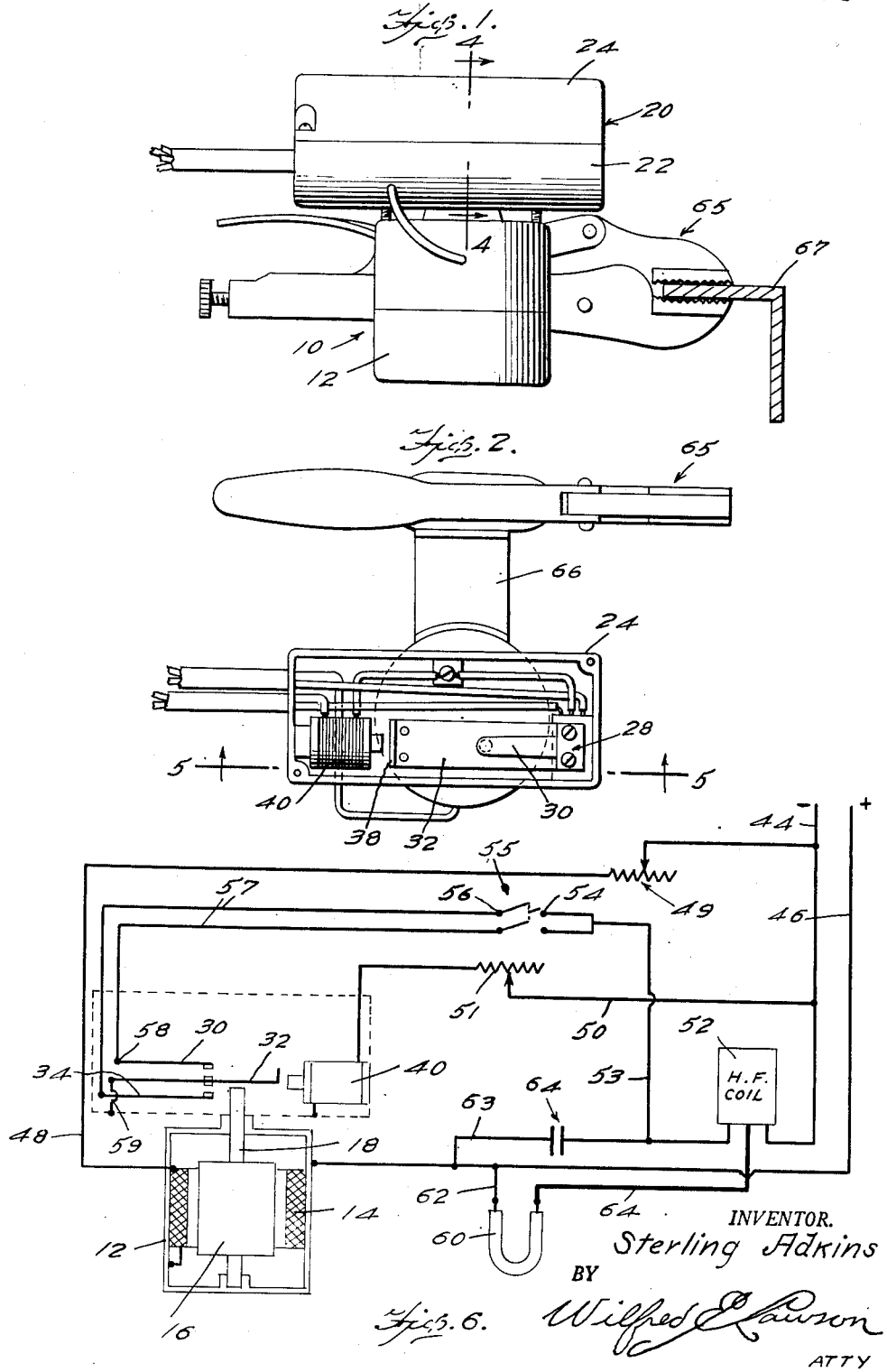
INVENTOR.
Sterling Adkins
BY
Wilfred E. Lawson
ATTY June 15, 1954
S. ADKINS
2,680,966
WHEEL BALANCE TESTING APPARATUS
Filed Nov. 30, 1951
2 Sheets-Sheet 2
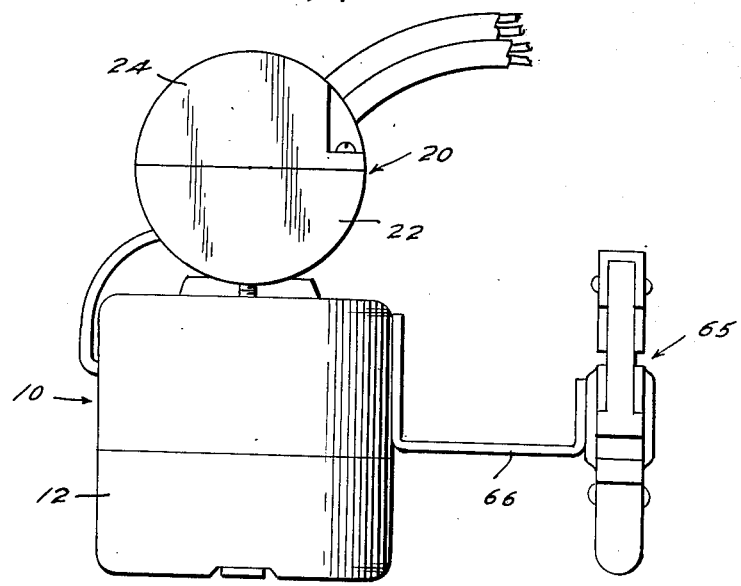
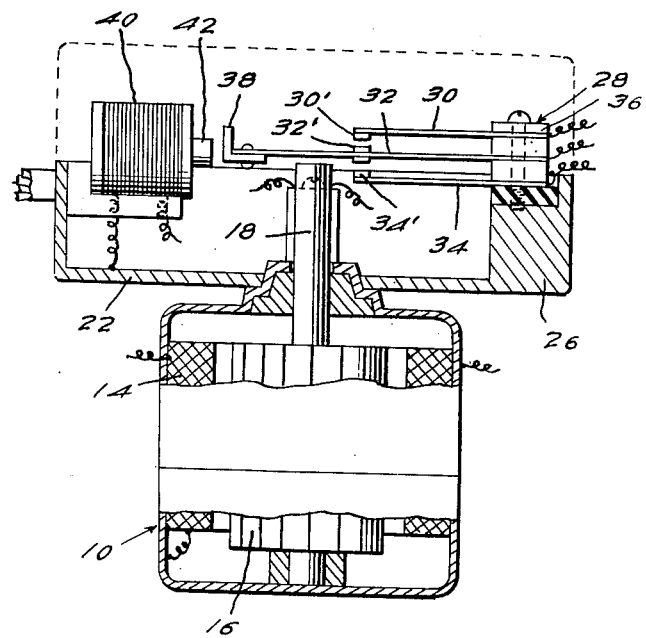
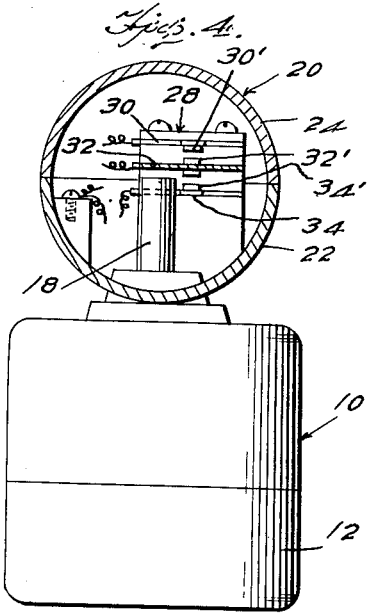
INVENTOR.
Sterling Adkins
BY
Wilfred E. Lawson
ATTY Patented June 15, 1954

2,680,966

UNITED STATES PATENT OFFICE 2,680,966

WHEEL BALANCE TESTING APPARATUS

Sterling Adkins, Newton, Ill.

Application November 30, 1951, Serial No. 259,033

3 Claims. (Cl. 73—66)

This invention relates generally to the class of testing and is directed particularly to a testing device designed to facilitate the balancing of motor vehicle wheels.

A principal object of the present invention is to provide an improved electrically operated apparatus by means of which the nature of unbalance in a motor vehicle wheel can be determined, if such unbalance exists, whereby proper steps can be taken to apply a counterbalancing weight to the wheel so that the wheel when rotating will be in proper balance and will not transmit vibratory motion to the motor vehicle to cause difficult steering or bad roadability of the machine.

Another object of the invention is to provide an apparatus of the above described character which is applied to the motor vehicle body to pick up vibrations of an adjacent wheel when the latter is freely spun and to show to the user of the device by stroboscopic effect where the unbalance, if any, of the wheel exists.

A still further object of the invention is to provide an electrically operated vibration device designed for application to a motor vehicle adjacent to a wheel which is so designed that when the wheel is freely spun, if it is unbalanced so as to cause vibration to surrounding parts of the vehicle body, such vibration will result in the opening and closing of an electrical circuit to effect, in turn, the flashing of a lamp, such as a gas filled tube, which, when focused on the wheel, will designate the point of unbalance in the wheel.

Other objects and advantages of the invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

In the drawings:

Figure 1 is a view in side elevation of a device constructed in accordance with the present invention, showing a supporting clamping means therefor gripping a portion of the motor vehicle body, the gas filled lamp being omitted.

Figure 2 is a view in top plan of the device with the switch housing cover removed.

Figure 3 is a view in end elevation of the device.

Figure 4 is a transverse section taken substantially on the line 4—4 of Figure 1 with the motor casing in elevation.

Figure 5 is a sectional view taken substantially on the line 5—5 of Figure 2.

Figure 6 is a diagram of the electric circuit.

Referring now more particularly to the drawings the numeral 10 generally designates an electric motor which is preferably of the 6 volt type and which may have a speed of approximately 1750 R. P. M. The motor comprises the metal housing or casing 12 in which is the field coil 14 and armature 16, the armature shaft being designated 18.

In accordance with the present invention the motor armature should have approximately 1/8 inch of end play, for the purpose hereinafter pointed out.

Secured to one end of the motor housing 12 is a switch housing which is generally designated 20 and which comprises the fixed half 22, which is secured to the motor housing, and the removable half or cover 24. This switch housing is here shown as being of circular cross section and of a length somewhat greater than the width of the motor housing but, it is to be understood that the invention is not limited to a switch housing of this form.

As shown in Figure 5 the armature shaft 18 has an end extended into the switch housing 20 to the side of the fixed half 22.

Within the part 22 an end portion of the wall is formed as indicated at 26 to provide a supporting shoulder on which is secured an insulation mounting 28 for the three switch blades 30, 32 and 34. The mounting 28 is made up of a series of insulation bodies 36 between which the switch blades are held whereby such blades are maintained electrically separated.

The switch blades are in spaced parallel relation as shown and the middle blade 32 is of materially greater length than the blades 30 and 34 and carries upon its free end the armature 38, for the purpose hereinafter stated.

As is also clearly shown in Figures 5 and 6 the end of the motor armature shaft 18 is directed toward the central blade 32 but is spaced slightly therefrom when the motor is idle and the armature of the motor has shifted inwardly.

Each of the shorter switch blades 30 and 34 has a contact point 30' and 34' respectively on the side thereof adjacent to the central blade 32 and the central blade 32 carries on opposite faces the contact points 32', each of which is in position to be engaged by a contact point of the adjacent short switch blade when the longer blade 32 is flexed to a sufficient extent in either of two directions from its central position.

In the end of the fixed part 22 of the switch housing there is mounted the electro-magnet 40, the core 42 of which is directed lengthwise of the housing toward and is in close proximity to the armature 38 carried by the central switch blade 32. The armature 38 is slightly offset from the longitudinal center of the electro-magnet core whereby when the magnet is energized the armature will be centered with respect to the core 42 so as to flex the blade 32 toward the blade 34 and bring the contacts 34' and 32' into electrical connection.

The electrical circuit employed in association with the present apparatus and in which the parts thus far described are connected, is illustrated in Figure 6. As here shown the two conductors 44 and 46 are provided for connection with a suitable source of current, the conductor 46 being grounded to the motor casing 12 with which one side of the field coil 14 is electrically connected, the other side of the coil being connected with the return conductor 44, by the current conductor 48 through the motor control rheostat 49.

One side of the electro-magnet 40 is connected by the conductor 50, through the control rheostat 51, with the negative conductor 44 as illustrated and the other side of the electro-magnet is grounded to the metal casings 20 and 12.

The reference character 52 designates a high frquency induction coil, one element of which is connected at one side with the current feed conductor 44 while the other side of such element has the conductor 53 connected therewith which leads to and is electrically connected with the two terminals 54 of a double pole, single throw switch 55, each of the two poles or blades 56 of which is adapted to be electrically connected with a terminal 54.

Each of the switch blades 56 has connected therewith one end of one of two independent conductors 57 and the other end of each conductor is electrically connected as at 58, with one of the two short switch blades 30 or 34.

The central electro-magnet controlled switch blade 32 is grounded to the metal housing 20 as indicated at 59.

The reference character 60 designates a flash lamp which may be of the usual gas filled variety such as a neon lamp or tube which may be housed within a suitable reflector housing, not shown, and this lamp is connected at one side to the high frequency terminal of the coil 52 by the conductor 61 while the other side of the lamp is connected by the conductor 62 with the electric current supply conductor 46.

Connected across between the conductor 53 and the conductor 46 in the line 63, is a condenser 64 which reduces arcing between the contact points of the switch blades.

In the use of the present apparatus the housings 10 and 20 are mounted upon some part of the motor vehicle body and to facilitate such mounting there is provided a clamp generally designated 65, of a suitable type such as the well known locking pliers marketed under the trade name "Vice-Grip" wrench or pliers. Such a clamp is joined to the body of the motor housing 10 by a suitable connecting bracket 66 so that when the clamp is secured to an element of the motor vehicle, as, for example, the edge of the vehicle fender or a portion of the frame, represented by the part designated 67 in Figure 1, the two housings will be securely coupled with such body part so that any movements or vibrations of the same will be transmitted to the motor housing.

In the operation of the present apparatus, the switch 55 is closed and the current conductors 44—46 are connected with a suitable source of electric potential while the device itself is mounted on a part of the vehicle body by means of the clamp 65.

When the current flows through the motor conductors 46—48, the armature when it starts rotating, will shift axially to bring it to a centering position in the field coil and in so shifting the end of the shaft 18 will come into engagement with the switch blade 32 and force it into electrical contact with the blade 30. As will be understood when the conductors 44—46 are put into the electric circuit the electro-magnet 40 will be energized and will exert a pull upon its armature 38 in a manner to regulate the flexible characteristics of the switch blade 32 for different degrees of vibration, but this will be opposed by the axially moved motor armature shaft 18 to close or electrically connect the blades 30 and 32 as stated; the magnitude of pull of the electro-magnet being governed by the valve of the current impressed on the magnet winding.

The motor vehicle wheel adjacent to which the device has been fixed on the vehicle body, is then spun freely and at a speed which would approximate the speed of the vehicle at 50 miles per hour. If the device is mounted on the vehicle so that the electric motor shaft 18 is vertically disposed and if the spinning wheel is heavier on one side than on the other a vibratory motion will be transmitted to the vehicle body and since the spinning armature of the motor will tend through inertia to maintain its position or to resist axial movement, the vibration will be transmitted to the motor housing causing the housing to move relative to the motor armature 16. As a result the switch housing will be rapidly shifted so that the motor armature shaft 18 will have movement relative to the blade 32 and as the shaft moves away from the blade the electro-magnet 40 will pull the blade 32 to a position where the contacts 34' of the blade 34 and 32' of the center switch blade will come into electrical engagement and upon reverse movement of the switch housing the motor armature shaft 18 will again cause the blades 30 and 32 to be brought into electrical contact. Thus the circuit will be rapidly broken and the intermittent flow of current through the induction coil will cause the gas tube 60 to light intermittently twice in each revolution of the wheel under test. However, by substituting a single blade switch for each of the blades of the double bladed switch 55, and closing one or the other of the same, the tube 60 will flash but once in each revolution of the wheel, as for instance, the one which closes the circuit at the contacts 30'—32'.

In other words the vibration is felt as the wheel lifts itself each time the heavy place on the tire makes a revolution. As an example, an unbalanced wheel spinning at 100 R. P. M.'s would light the gas filled tube 100 times per minute and by focusing this light on the wheel the wheel will be made to appear to stop at each flash of the light, by stroboscopic effect, and thus by observing the position of the valve stem or some other marking on the tire, a determination of the heavy spot can be readily made since it is known that the heavy spot will cause the rotating wheel to rise just before such spot reaches the high point of the wheel.

For example, if the wheel and tire are spun anti-clockwise and it is observed when the flashing light appears to stop the tire, that the valve stem is at the lower left hand side of the wheel the operator stops the rotating wheel and, knowing by experience that a heavy tire lifts itself each revolution and sets up vibrations just before it comes to the top and starts back down, will add weights to the tire opposite this heavy spot or opposite to a spot near the upper right hand side of the tire. If too much weight is added and the tire is again spun in the same direction as before, the light will then spot the heavy point of the tire at the place where the weight was added. In other words, the heavy point of the tire will now be directly opposite what was previously the heavy spot. The operator can then take off some of the weight and this operation repeated until, upon spinning the wheel in the same or either direction, no vibrations will be set up and accordingly the light will not flash indicating that the tire is in balance.

Since the greater the unbalance of the wheel, the more vibrations will be set up, the operator, by varying the strength of the electro-magnet by means of the rheostat 51, can determine approximately how much weight has to be added to bring the wheel into balance. In other words, if the wheel is only slightly out of balance the operator by turning up the rheostat increases the strength of the electro-magnet which will apply a stronger pull to the armature 38 thereby preventing the light vibrations from effecting the closing of the switch blades. By then reversing the rheostat until the vibrations again effect the closing of the switch blades and the flashing of the light, the operator can tell by the reduction of the magnet strength approximately how much weight should be added to the wheel. It will, of course, be apparent that the more experince an operator has in the use of the device, the more readily he can determine by the position of the rheostat just how much weight to apply to the wheel to bring the wheel into balance.

For controlling the pull of the core 42, of the electromagnet 40, on the armature 38 to regulate the degree of vibration of the switch blade 32, the rheostat 51 is provided with three interconnected resistances $R_1$, $R_2$ and $R_3$, and three "on" positions and an "off" position, and is of a design that, with it and the electromagnet connected in circuit with a 6 v. D. C. current source, enough pull can be applied to the armature 38 to prevent vibration of the blade 32, providing that the wheel is not over 3 ounces off balance and is, for instance, equipped with a 600 x 16 tire. The third "on" position of the rheostat 51 impresses full current value on the electromagnet 40, giving it maximum pulling power; the second, or intermediate, "on" position will give ⅔ of its pulling power; and the first "on" position will give ⅓ of its pulling power; while the "off" position allows the blade 32 to respond to even the slightest vibration. Thus, with a 600 x 16 wheel, if it requires that the rheostat be set at its third "on" position to put the tube 50 out, three ounces of weight is to be applied to put the wheel in balance; if at its second "on" position apply two ounces of weight; and, if at its first "on" position, apply one ounce of weight.

I claim:

1. In an apparatus for detecting unbalance in a motor vehicle wheel and the tire thereon, a vertical cylindrical housing, clamp means fixed to said housing for connection with the body of a vehicle, an electric motor within the housing and having its field coil secured to the side wall of the housing, and having an armature normally offset in a downward direction and the shaft thereof extending from each of its ends, a bearing in the bottom of the housing supporting the lower end of said shaft, the upper end of the shaft projecting upwardly through the top of the housing, said armature being moved vertically into centered relation with respect to the field coil of the motor when the latter is energized and held vertically stationary in space through inertia, a make and break device supported on the housing and having a pair of spaced fixed contacts and a flexible contact element interposed between the same and positioned to be actuated by one end of said shaft, a flash lamp in circuit with said contacts and a current source, and means for regulating the vibration characteristics of said contact element, said housing being shiftable in an up and down direction relative to said armature by vibration of the body of the vehicle due to the unbalanced state of the wheel causing such vibration when the wheel is rotated, thereby causing said shaft to actuate the flexible contact element relatively to the fixed contacts to effect flashing of the lamp.

2. The apparatus as defined in claim 1, with a second housing mounted on the top of the first housing and having said make and break device and said means mounted therein, the projecting end of said shaft extending into said second housing for the aforesaid cooperation with the said flexible contact element.

3. The apparatus as defined in claim 1, with an armature carried at the free end of the said flexible contact element, and wherein the said means is an electro-magnet cooperative with the latter armature to exert the pull on the flexible contact element when it is energized, a rheostat for varying the value of the current impressed on the electro-magnet to regulate the pulling force thereof, and a second rheostat for varying the value of the current impressed on the field of the motor.

References Cited in the file of this patent

UNITED STATES PATENTS

| Number | Name | Date |
|---|---|---|
| 2,491,603 | Brooks | Dec. 20, 1949 |
| 2,522,260 | Forster | Sept. 12, 1950 |
| 2,565,577 | Schnoebelen | Aug. 28, 1951 |